(12) United States Patent
Balle et al.

(10) Patent No.: US 7,093,431 B2
(45) Date of Patent: Aug. 22, 2006

(54) EXHAUST GAS TREATMENT DEVICE

(75) Inventors: Andreas Balle, Esslingen (DE);
Bernd-Peter Scherer, Notzingen (DE);
Georg Wirth, Kirchheim/Teck (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 326 days.

(21) Appl. No.: 10/752,389

(22) Filed: Jan. 6, 2004

(65) Prior Publication Data
US 2004/0139741 A1 Jul. 22, 2004

(30) Foreign Application Priority Data
Jan. 11, 2003 (DE) ............................... 103 00 780

(51) Int. Cl.
*F01N 3/10* (2006.01)

(52) U.S. Cl. ............................ 60/299; 60/297; 60/311; 422/77

(58) Field of Classification Search ............ 60/299, 60/311, 297; 422/177, 179, 180; 55/DIG. 30
See application file for complete search history.

(56) References Cited

U.S. PATENT DOCUMENTS

| | | | |
|---|---|---|---|
| 4,353,873 A | 10/1982 | Noritake et al. | |
| 4,448,754 A * | 5/1984 | Isogai et al. | 422/179 |
| 4,495,153 A | 1/1985 | Midorikawa | |
| 5,555,621 A | 9/1996 | Tanabe et al. | |
| 6,635,227 B1 * | 10/2003 | Shibata et al. | 422/179 |

FOREIGN PATENT DOCUMENTS

| | | |
|---|---|---|
| EP | 0 467 247 | 1/1992 |
| EP | 1 036 820 | 9/2000 |
| EP | 1 036 920 | 9/2000 |

* cited by examiner

*Primary Examiner*—Thomas Denion
*Assistant Examiner*—Diem Tran
(74) *Attorney, Agent, or Firm*—Collard & Roe, P.C.

(57) ABSTRACT

The present invention relates to an exhaust gas treatment device (1), in particular for an internal combustion engine, preferably in a motor vehicle, comprising a housing (2) as well as a substrate body (3) which is situated therein and through which exhaust gases can flow in an axial direction (5). The substrate body (3) is supported axially on the housing (2) via an axial bearing (8) on at least one axial end face (11).

To improve the axial support of the substrate body (3), the axial bearing (8) has a supporting ring (10) mounted on the housing and having a U-shaped profile (12), which is open axially toward the end face (11). A bearing ring (17) made of bearing material engages into the U-shaped profile (12) of the supporting ring (10) on its axial end, which faces away from the substrate body (3) and is supported thereon axially. With its axial end facing the substrate body (3), the bearing ring (17) is supported on the end face (11).

18 Claims, 1 Drawing Sheet

EXHAUST GAS TREATMENT DEVICE

CROSS REFERENCE TO RELATED APPLICATIONS

Applicants claim priority under 35 U.S.C. §119 of German Application No. 103 00 780.6 filed Jan. 11, 2003.

BACKGROUND OF THE INVENTION

1. Field of the Invention

The present invention relates to an exhaust gas treatment device, in particular for an internal combustion engine, preferably in a motor vehicle.

2. The Prior Art

Exhaust gas treatment devices such as a catalytic converter or a particulate filter, in particular a soot filter, usually have a housing in which a suitable substrate body is arranged. The substrate body usually consists of a ceramic material, while the housing is made of sheet metal. Different thermal expansion coefficients result in extremely different thermal expansion properties of the housing and substrate body in operation of the exhaust gas treatment device. Accordingly, the substrate body cannot be mounted directly on the housing but instead must be secured via appropriate bearings in the housing. It is customary to use a radial bearing, in which a bearing mat made of a suitable bearing material surrounds the substrate body on the outside radially and supports it radially on the housing. This also results in an axial fixation and support of the substrate body on the housing by way of the bearing mat, i.e., by way of the radial bearing, due to an appropriately dimensioned radial compression of this bearing mat at the time of installation. Such a design has proven successful at least for catalytic converters.

In the case of particulate filters, in particular soot filters, a pressure drop which occurs in flow through the substrate body is much greater than the pressure drop with a substrate body of a traditional catalytic converter. Accordingly, the axial forces acting on the substrate body of a particulate filter (pressure difference at the axial end faces, frictional forces of the gas flow) are much greater than those with a traditional catalytic converter.

SUMMARY OF THE INVENTION

The present invention is concerned with the problem of providing an improved design for an exhaust gas treatment device of the type defined in the preamble such that the axial support of the substrate body in the housing is improved in particular.

This problem is solved according to this invention by the object of the independent claim. Advantageous embodiments are the object of the dependent claims.

This invention is based on the general idea of axially supporting the substrate body on at least one axial end at the outside edge of its axial end faces with a bearing ring made of a suitable bearing material, whereby the bearing ring is in turn inserted into a trough-shaped supporting ring and is supported by way of this ring on the housing. The axial forces which then occur can thus be transferred from the substrate body to the bearing and from the latter via the supporting ring to the housing. Thus, there is no direct, i.e., rigid, support of the substrate body on the housing but instead there is indirect, i.e., elastic or at least flexible, support by way of the bearing ring. The risk of damage to the substrate body can thus be reduced even when the axial forces are relatively large. The proposed axial bearing is therefore particularly suitable for axial support of a substrate body in a particulate filter, in particular in a soot filter.

With appropriate dimensioning of the bearing ring, which may have a comparatively thin profile in the radial direction, only comparatively little bearing material is needed to support the bearing ring. In particular when the bearing ring is designed as a wire knit, the savings of material that can be achieved may have an advantageous effect on the manufacturing cost. In addition, the bearing ring has a negative effect on the axial flow through the substrate body only in a comparatively small cross section due to the thin construction in the radial direction. This improves the efficacy of the exhaust gas treatment device and at the same time reduces the pressure drop which occurs with this flow.

The supporting ring may advantageously be designed as a separate component, which is fastened on the housing in the manufacture of the exhaust gas treatment device. This makes it possible to equalize position tolerances in attaching the supporting ring, so as to thereby achieve the most uniform possible axial support along the bearing ring.

According to an advantageous embodiment, the supporting ring may have a gap, i.e., the supporting ring may have an interruption in the circumferential direction. This design makes it possible equalize shape tolerances in the housing section on which the supporting ring is mounted in assembly of the supporting ring.

Other important features and advantages of this invention are derived from the subclaims, the drawings and the respective description of the figures on the basis of the drawings.

It is self-evident that the features which are mentioned above and are yet to be described below can be used not only in the combination given here but also in any other combinations or alone without going beyond the scope of the present invention.

BRIEF DESCRIPTION OF THE DRAWINGS

A preferred exemplary embodiment of this invention is illustrated in the drawing and is explained in greater detail in the following description.

DETAILED DESCRIPTION OF PREFERRED EMBODIMENTS

Figure 1:
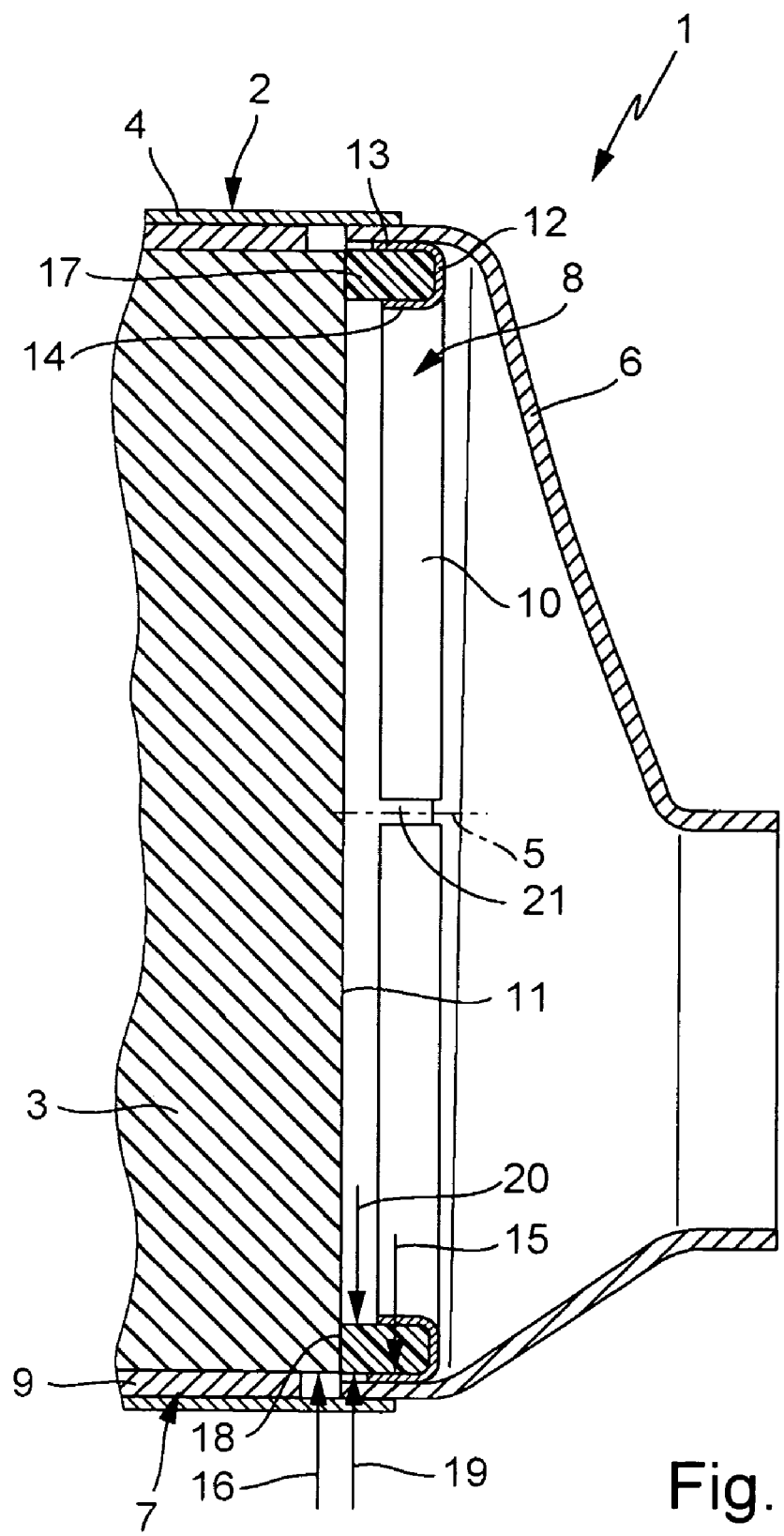
FIG. 1, the only FIGURE, shows a longitudinal section through an exhaust gas treatment device in the area of an axial bearing.

According to FIG. 1, an exhaust gas treatment device 1 has a housing 2 in which a substrate body 3 is situated. The exhaust gas treatment device 1 is used for installation in an exhaust gas line of an internal combustion engine, in particular in a motor vehicle. The exhaust gas treatment device 1 is preferably a particulate filter, in particular a soot filter. Likewise, the exhaust gas treatment device 1 may be designed as a catalytic converter.

The housing 2 is designed here in several parts and has at least one jacket 4, which radially encloses the substrate body 3 with respect to an axial direction 5; it also has a bottom 6, which is connected axially to the jacket 4 and seals the housing 2 axially. The bottom 6 is designed here in the form of a hopper.

The substrate body 3 is supported in the housing 2 by means of a radial bearing 7 and also by means of at least one axial bearing 8. In the case of a substrate body 3 through which exhaust gases can flow in the axial direction 5, it is expedient to provide such an axial bearing 8 at least on an outflow side of the substrate body 3 so as to support the axial forces which occur in operation of the exhaust gas treatment device 1 between the substrate body 3 and the housing 2. Accordingly, FIG. 1 also shows an end of the exhaust gas treatment device 1 on the outflow side. Essentially, however, the oncoming flow end of the exhaust gas treatment device 1, which is not shown here, may also have a corresponding design.

The radial bearing 7 generally includes a bearing mat 9 made of a suitable bearing material. The bearing mat 9 encloses the substrate body 3 along its outside circumference and thus supports the substrate body 3 in the radial direction on the housing 2.

The substrate body 3 is usually designed as a monolithic body and in particular is made of ceramic.

The axial bearing 8 includes a supporting ring 10, which is fixedly mounted on the housing and is designed here as a separate component which is attached in a suitable manner to the housing 2, namely here to the bottom 6 (hopper, i.e., discharge hopper). The supporting ring 10 forms a trough which is open toward an axial end face 11 of the substrate body 3. To this end, the supporting ring 10 has a U-shaped profile 12 which is open toward the end face 11, here the end face 11 on the outflow side. The U-shaped profile 12 has an outer leg 13, which is on the outside radially, and an inside leg 14, which is on the inside radially. In the embodiment shown here, the dimensions of the supporting ring 10 are such that the outside leg 13 has an inside cross section 15 on the inside radially, this inside cross section being approximately equal in size to an outside cross section 16 of the substrate body 3 on the end face 11. The inside cross section 15 of the outside leg 13 may also be slightly larger than the outside cross section 16 of the substrate body 3.

The substrate body 3 expediently has a cylindrical cross section, in particular a regular cylindrical, oval or elliptical cross section. The supporting ring 10 also has a complementary shape accordingly.

If the substrate body 3, the supporting ring 10 and the bearing ring 17 have circular cross sections, then the relationships described above and below for the cross sections are also applicable accordingly for the respective diameters.

The axial bearing aid 8 also includes a bearing ring 17 made of a suitable bearing material. The bearing ring 17 is inserted into the U-shaped profile 12 of the supporting ring 10. In the installed state shown here, the bearing ring 17 is supported with an axial end facing the substrate body 3 on the end face 11 of the substrate body 3. The bearing ring 17 is supported on the supporting ring 10 on its axial end which faces away from the substrate body. The bearing ring 17 is preferably designed as a knit, in particular a wire knit, and it expediently forms a flexible knit cushion, in particular a wire knit cushion. Due to this design, the bearing ring 17 may be designed as a spring having a predetermined spring characteristic. In this way, the substrate body 3 is supported axially against the spring force of the bearing ring 17. The bearing ring 17 is expediently mounted with an axial prestress, which may also be designed so that an adequate axial prestress or residual stress is also available in the usual operating states of the exhaust gas treatment device 1 for positioning the substrate body 3 axially in the housing 2.

FIG. 1 shows the installed state in which the bearing ring 17 is already prestressed, i.e., compressed in the axial direction.

As shown in FIG. 1, the supporting ring 10 in the installed state is at an axial distance from the end face 11 of the substrate body 3 facing it. This distance is bridged by the bearing ring 17, which engages in the U-shaped profile 12 of the supporting ring 10. This distance permits relative axial movements between the supporting ring 10 and the substrate body 3. Such relative movements occur in particular because of thermal expansion effects. The dimensions of the bearing ring 17 and the U-shaped profile 12 are coordinated so that first, the outside leg 13 supports the bearing ring 17 radially on the outside and on the other hand the inside leg 14 supports the bearing ring 17 on the inside radially. Due to this radial support of the bearing ring 17 on two sides, it is more or less clamped in the supporting ring 10 and is stabilized with regard to its shape. Bulging of the bearing ring 17 under high axial forces can thereby be prevented. The axial supporting effect of the axial bearing 8 is thus improved.

The bearing ring 17 is dimensioned and positioned in such a way that it is axially supported on the substrate body 3 only in an edge section 18 of the end face 11, which is on the outside radially and is relatively narrow in the radial direction. Therefore, the free flow cross section of the substrate body 3 is reduced only slightly or not at all by the axial bearing 8. With regard to the preferred dimensions of the supporting ring 10, this also yields corresponding dimensions for the bearing ring 17. For example, an outside cross section 19 of the bearing ring 17 is approximately equal in size to the outside cross section 16 of the substrate body 3 on the end face 11. An inside cross section 20 of the bearing ring 17 is accordingly smaller than the outside cross section 16 of the substrate body 3. It is clear that the supporting ring 17 with its outside angle 13 can also protrude (slightly) above the substrate body 3 in the radial direction.

At the same time, this design ensures that the bottom 6 is also at a distance radially from the substrate body 3 so as not to block axial movements of the substrate body 3.

The bearing ring 17 here has a profile, which extends further in the axial direction than in the radial direction. Expediently the axial extent of the bearing ring profile is approximately twice as great as its radial extent.

With the present exhaust gas treatment device 1, it is also particularly important that the bearing mats 9 of the radial bearing 7 and the bearing ring 17 of the axial bearing 8 are designed as separate components, which in particular do not come in contact but instead are positioned with an axial distance between them. First, this makes it possible to avoid interactions between the radial bearing 7 and the axial bearing 8, and secondly, the separate design makes it possible to select suitable bearing materials for the bearing mat 9 and the bearing ring 17 as a function of the particular requirements.

The supporting ring 10 is expediently manufactured as a separate component. In assembly of the exhaust gas treatment device 1, this permits individual positioning and adjustment of the supporting ring 10 to compensate for manufacturing tolerances. In this way, a uniform pressure on the bearing ring 17 can be achieved. In the circumferential direction, the supporting ring 10 has an interruption 21, which makes it possible to compensate for manufacturing tolerances on installation of the supporting ring 10. The split or slotted supporting ring 10 may thus be adapted better to the contour of the housing 2, namely the bottom 6 here.

In the preferred embodiment shown here, the inside leg 14 of the U-shaped profile 12 is designed to be shorter in the axial direction than the outside leg 13. Due to this design, the portion of the exhaust gas flow entering into the bearing ring 17 at the outside edge 18 can be returned better into the main flow.

The exhaust gas treatment device 1 is expediently assembled as follows:

The supporting body 3 is inserted together with the radial bearing 7 into the jacket 4 in the traditional manner. The supporting ring 10 is inserted into the bottom 6 and/or into the hopper 6, and manufacturing tolerances can be compensated in the process. By an appropriate adjustment of the supporting ring 10, it can be aligned for optimum axial contact of the supporting ring 17. After fastening the supporting ring 10 to the bottom 6, in particular by welding, the bearing ring 17 is inserted into the supporting ring 10. Then the bottom 6 is inserted into the jacket 4. The prestress on the bearing ring 17 can be adjusted by the depth of insertion of the bottom 6. At the same time, angularity of the substrate body 3 can be compensated by appropriate alignment of the bottom 6. Then the bottom 6 is attached to the jacket 4, in particular by welding.

The invention claimed is:

1. An exhaust gas treatment device,
   comprising a housing and a substrate body situated in the housing through which exhaust gases can flow in an axial direction,
   wherein the substrate body is supported axially by an axial bearing on the housing on at least one axial end face,
   wherein the axial bearing has a supporting ring, which is fixedly mounted on the housing and has a U-shaped profile open axially toward the end face of the substrate body,
   wherein the axial bearing has a bearing ring of a bearing material which engages in the U-shaped profile of the supporting ring on its axial end facing away from the substrate body and is supported axially thereon and which is supported on the end face of the substrate body with its axial end facing the substrate body; and
   wherein the supporting ring is fastened to an axial bottom of the housing, and the bottom is fastened to a jacket of the housing.

2. The exhaust gas treatment device according to claim 1, wherein
   the bearing ring is designed as a knit or a wire knit or a knit cushion or a wire knit cushion.

3. The exhaust gas treatment device according to claim 1, wherein
   the bearing ring supports the substrate body axially on an edge section which is on the outside radially of the axial end face.

4. The exhaust gas treatment device according to claim 1, wherein
   an outside cross section of the bearing ring is equal to or greater than an outside cross section of the substrate body on its end face,
   an inside cross section of the bearing ring is smaller than the outside cross section of the substrate body on its end face.

5. The exhaust gas treatment device according to claim 1, wherein
   an outside leg which is on the outside radially of the U-shaped profile of the supporting ring has on its inside radially an inside cross section which is equal to or greater than an outside cross section of the substrate body on its end face.

6. The exhaust gas treatment device according to claim 1, wherein
   the supporting ring is at a distance axially from the end face of the substrate body facing it.

7. The exhaust gas treatment device according to claim 1, wherein
   an inside leg which is on the inside radially of the U-shaped profile of the supporting ring, is shorter axially than an outside leg which is on the outside radially of the U-shaped profile of the supporting ring.

8. The exhaust gas treatment device according to claim 1, wherein
   the substrate body is supported axially on the housing via the axial bearing at least on its axial end face on the outflow side.

9. The exhaust gas treatment device according to claim 1, wherein
   the bearing ring has a profile whose extent in the axial direction is greater than or approximately twice as large as its extent in the radial direction.

10. The exhaust gas treatment device according to claim 1, wherein
    the dimensions of the supporting ring and the bearing ring are coordinated so that two legs of the U-shaped profile of the supporting ring support the bearing ring on the outside radially and on the inside radially.

11. The exhaust gas treatment device according to claim 1, wherein
    the bearing ring is designed as a spring having a predetermined characteristic.

12. The exhaust gas treatment device according to claim 1, wherein
    the exhaust gas treatment device is a particulate filter or a soot filter or a catalytic converter.

13. The exhaust gas treatment device according to claim 1, wherein
    the supporting ring is designed as a separate component, which is fastened to the housing.

14. The exhaust gas treatment device according to claim 13, wherein
    the supporting ring has an interruption in the circumferential direction.

15. The exhaust gas treatment device according to claim 1, wherein
    the substrate body is supported radially on the housing by a radial bearing along its circumference,
    the radial bearing has a bearing mat made of bearing material surrounding the substrate body on the outside radially, and
    the bearing ring and the bearing mat are separate components.

16. The exhaust gas treatment device according to claim 15, wherein
    the bearing ring and bearing mat are spaced a distance apart from one another axially.

17. The exhaust gas treatment device according to claim 1, wherein
    the bearing ring is installed with an axial prestress.

18. The exhaust gas treatment device according to claim 17, wherein
    the prestress is selected so that there is a residual axial stress even during operation of the exhaust gas treatment device.

* * * * *